UNITED STATES PATENT OFFICE.

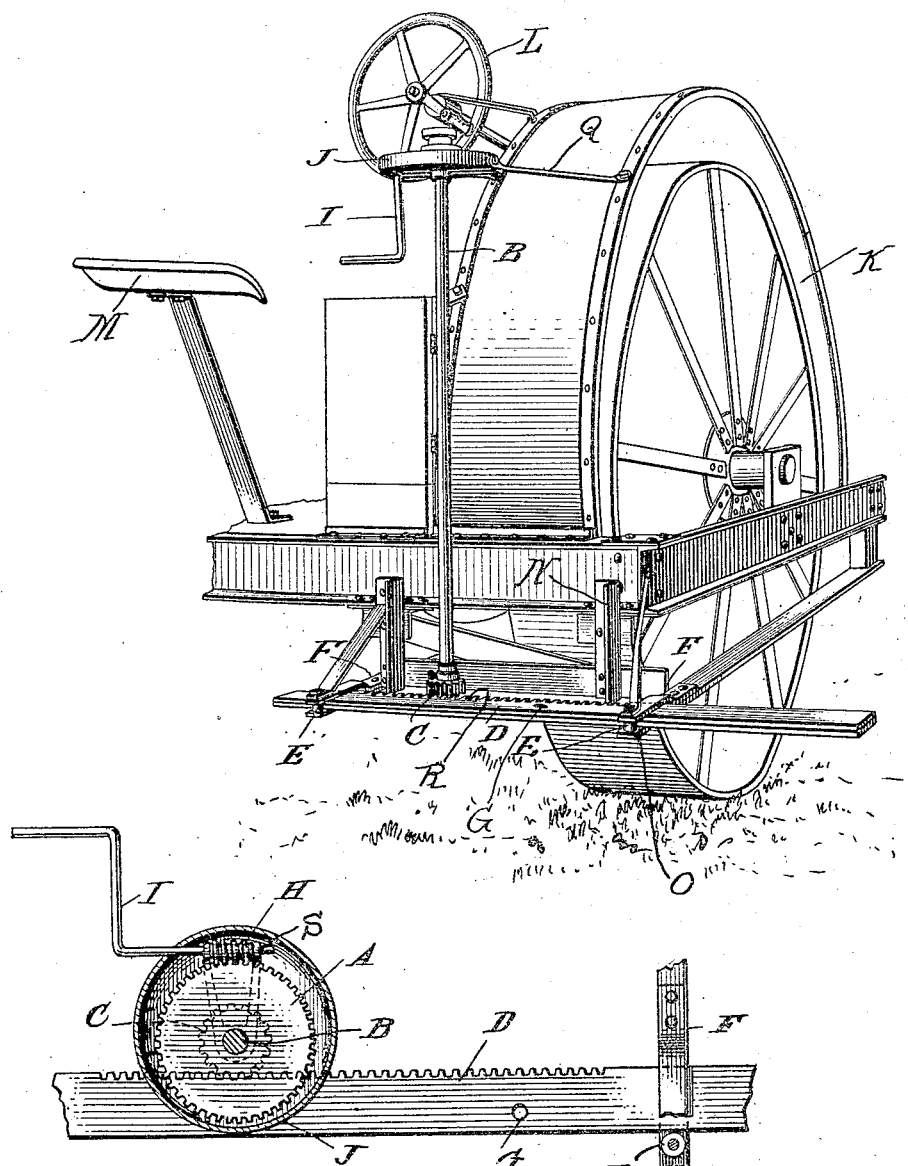

ARTHUR J. KNIERIEM, OF SCRIBNER, AND GEORGE H. HILBERS, OF HOOPER, NEBRASKA.

SHIFTABLE TRACTOR DRAW-BAR.

1,213,385.

Specification of Letters Patent.

Patented Jan. 23, 1917.

Application filed May 17, 1916. Serial No. 98,224.

*To all whom it may concern:*

Be it known that we, ARTHUR J. KNIERIEM and GEORGE H. HILBERS, the former residing at Scribner, county of Dodge, and State of Nebraska, and the latter at Hooper, county of Dodge, State of Nebraska, have invented a Shiftable Tractor Draw-Bar, of which the following is a specification.

The present invention relates to improvements in draw-bars and more particularly to that class known as shiftable draw-bars and designed specially for use in connection with tractors.

The primary object of the invention is the provision of a draw-bar such as above described which is capable of transverse adjustment relative to the tractor to which the same is applied.

Another object of the invention is the provision of means for adjusting the said draw-bar relative to the tractor.

Still another object of the invention is the provision of an adjusting means with the draw-bar which is capable of locking the latter in its several adjusted positions and holding it therein against any undesired movement.

A further object of the invention is the provision of novel means for supporting the adjusting means from the tractor in its proper relative position to and for coöperation with the draw-bar.

A still further object of the invention is the provision of a shiftable draw-bar for tractors, which will be comparatively simple and inexpensive to manufacture, reliable and efficient in use, and readily operated, it being understood in this connection that various minor changes in the specific details of construction can be resorted to within the scope of the appended claims, without departing from the spirit or sacrificing any of the advantages of the invention.

In the accompanying drawing forming a part of the present application: Figure 1 is a perspective view showing a portion of the tractor with the draw-bar applied thereto; and Fig. 2 is a horizontal sectional view with parts broken away taken through the upper portion of the shifting mechanism.

Referring now to the accompanying drawing by similar characters of reference throughout the several views, the letter K represents a tractor of any conventional or well known type, having the usual steering mechanism L and driver's seat M. A support frame N is secured to the rear of said tractor and includes a pair of rearwardly extending supporting arms F bifurcated at their outer ends as at O and forming guides for the draw-bar D which slides therein transversely of the tractor K, on the roller bearings E which are journaled in the outer ends of said arms F. A suitable aperture G is provided in the draw-bar D for connection with any well known type of draft attachment by means of which any suitable vehicle can be attached to the rear of said tractor K.

A casing J is connected by brackets Q secured to convenient portions with the tractor, in the rear of the same, and has journaled therein a depending shaft B which carries at its lower end a pinion C desired to mesh with the rack teeth R provided upon the inner edge of the draw-bar D so that as the shaft B is rotated in either direction by the operating mechanism to be hereinafter referred to the draw-bar D will be moved transversely of the tractor as desired by the operator. The casing J is mounted within the convenient reach of the operator's seat M and steering mechanism L so that the draw-bar D can be shifted without inconveniencing the operator in any way.

A pinion A is keyed to the shaft B within the casing J and meshes with a worm H carried by the operating crank shaft I which projects through the casing adjacent the said driver's seat M. The worm H is held rigid within the casing by the bracket S which forms a bearing on one end for the shaft B and extends between the perforated teeth of the pinion A and upwardly into two arms which engage and form bearings for the crank shaft I upon opposite sides of the said worm H.

Manifestly as the operator rotates the crank shaft I in either direction the draw-bar D will be moved transversely of the tractor in a corresponding direction through the mechanism of the worm H, pinion A, shaft B, pinion C and rack teeth R, and it will also be readily seen that the worm H will hold the shaft B against rotation by virtue of its intermeshing engagement with the pinion A, thereby preventing any undesired movement of the draw-bar D.

From the foregoing description taken in connection with the accompanying drawing it will be manifest that a shiftable draw-bar for tractors is provided which will fulfil all of the necessary requirements of such a device.

Having thus fully described the invention what we claim as new and desire to protect by Letters Patent is;

1. In a device of the character described, the combination of a casing secured to a tractor or the like, power transmitting means within said casing, a crank operating said power transmitting means, a shaft suspended from said casing and operatable by said power transmitting means, a gear carried by the lower end of said shaft, a rack in mesh with said gear, brackets supporting said rack, and rollers carried by said brackets in contact with the rear face of said rack.

2. In a device of the character described, the combination with a tractor of a supporting frame including bifurcated arms, a draw-bar having rack teeth thereon movable in said arms, a shaft, a pinion carried by the shaft and meshing with the rack teeth of the draw-bar, a casing, brackets extending from the tractor and supporting the casing and means within the casing from which a crank extends to within the convenient reach of the operator for rotating the shaft and moving the draw-bar transversely of the tractor.

3. In a device of the character described the combination with a tractor, of a movable draw bar carried thereby, a casing, brackets secured to the tractor and supporting said casing, a shaft journaled at one end in a portion of the casing and extending therein, a pinion keyed to said shaft within the casing, a pinion keyed to the opposite end of the shaft and engaging teeth formed upon the draw-bar, a crank shaft journaled in the casing, and a worm keyed to the crank shaft and concealed within the casing and engaging the pinion therein.

4. In a device of the character described, the combination with a tractor of a shiftable draw-bar having rack teeth provided upon one edge and movably mounted upon the tractor, a vertical shaft, a pinion keyed to one end thereof and meshing with the teeth of said draw-bar, a casing supported by the tractor and forming a bearing for the upper end of said shaft, a pinion keyed to the shaft within said casing, a bracket carried by the shaft and extending beyond the edge of the pinion within the casing, a crank shaft journaled in said bracket and a worm on the crank shaft and disposed between the ends of the bracket and meshing with the pinion in said casing as and for the purposes set forth.

ARTHUR J. KNIERIEM.
GEORGE H. HILBERS.

Copies of this patent may be obtained for five cents each, by addressing the "Commissioner of Patents, Washington, D. C."